United States Patent [19]

Hirano et al.

[11] Patent Number: 5,250,117
[45] Date of Patent: Oct. 5, 1993

[54] DEGREASING-CLEANING METHOD

[75] Inventors: Takashi Hirano; Hidetaka Sawada; Shoichi Momose; Shiro Inoue; Kazunori Koba, all of Osaka; Masayuki Isaka, Nara, all of Japan

[73] Assignee: Hitachi Zosen Corporation, Osaka, Japan

[21] Appl. No.: 812,992

[22] Filed: Dec. 24, 1991

[30] Foreign Application Priority Data

Dec. 26, 1990 [JP] Japan .................................. 2-406448
Nov. 19, 1991 [JP] Japan .................................. 3-303102

[51] Int. Cl.$^5$ ............................................. B08B 3/12
[52] U.S. Cl. ........................................... 134/1; 134/40; 134/24; 134/22.18; 134/22.12
[58] Field of Search .................... 134/1, 40, 34, 26, 17, 134/22.12, 24, 22.18

[56] References Cited

U.S. PATENT DOCUMENTS

| | | | |
|---|---|---|---|
| 3,894,883 | 7/1975 | Franz | 134/15 |
| 3,898,351 | 8/1975 | Kennison et al. | 134/1 |
| 4,762,668 | 8/1988 | Loose et al. | 376/310 |
| 4,870,982 | 10/1989 | Liu | 134/135 |
| 4,931,104 | 6/1990 | Burke | 134/40 |

Primary Examiner—Theodore Morris
Assistant Examiner—Edward Squillante
Attorney, Agent, or Firm—Armstrong, Westerman, Hattori, McLeland & Naughton

[57] ABSTRACT

A degreasing-cleaning method which employs as a liquid cleaning agent pure water having a resistivity of at least 10 megohm-cm and a temperature of at least 50° C. The pure water is sprayed onto the article to be cleaned at a pressure of at least 8 kg/cm$^2$.

6 Claims, 5 Drawing Sheets

DEGREASING-CLEANING METHOD

BACKGROUND OF THE INVENTION

The present invention relates to a degreasing-cleaning method for removing paraffinic or soap-type mold releasing agents or the like from molded plastics products and other materials or articles such as glass for liquid crystals, plastic lenses, glass lenses, photo-masks, disc ceramic substrates, quartz, heads, glass for CCDs and precision machine parts.

FIG. 7A and FIG. 7B show an apparatus for use in a conventional method. The apparatus comprises a mist room 41 (FIG. 7A), and a shower room 42 (FIG. 7B). The mist room 41 and the shower room 42 each have the article W to be cleaned, as suspended from the ceiling. The article W is a motor vehicle bumper. The mist room 41 contains a liquid cleaning agent L, which is an organic solvent such as trichloroethane. The cleaning agent L is heated with a heater 43 and converted to mist, which rises and is then cooled by coolers 44 to undergo condensation. The liquefied agent L adheres to the article W. Shower heads 45 are suitably arranged within the shower room 42 for applying the same organic solvent as above, i.e., agent L, to the article W. The cleaned article W is delivered from the shower room 42 and subsequently sent to a coating process.

Also known is other method wherein city water containing an acid or alkali added thereto for use as a liquid cleaning agent is sprayed on articles for cleaning.

The method wherein an organic solvent is used as the cleaning agent has found limited use because the organic solvent poses the problem of environmental pollution, so that it is desired to develop an alternative method.

On the other hand, the method wherein the acid- or alkali-containing city water is used as the cleaning agent requires a large amount of cleaning water and therefore releases a large quantity of waste water, which results in a problem of disposal.

SUMMARY OF THE INVENTION

The main object of the present invention is to provide a degreasing-cleaning method free of the foregoing problems.

The present invention provides a degreasing-cleaning method which is characterized in that pure water having a resistivity of at least 10 megohm-cm is used as a liquid cleaning agent.

The releasing agent, oil or fat adhering to the article to be cleaned is removed from the article with the cleaning agent and assumes the form of liquid droplets, which tend to adhere to the surface of the article again. This tendency becomes more pronounced if the ion concentration of the cleaning agent is higher, that is, if the resistivity thereof is lower. To prevent re-adhesion for effective cleaning, the resistivity is preferably higher, whereas excessively high resistivity is not economical. No problem will be actually encountered when the resistivity is at least 10 megohm-cm.

Preferably, the temperature of pure water is at least 50° C.

Although the temperature of pure water acts to soften the deposit on the article to be cleaned, temperatures exceeding 50° C. produce no change in this action.

When the pure water is sprayed onto the article to be cleaned at a pressure of at least 8 kg/cm$^2$, the deposit is removed from the article effectively.

The speed of the cleaning agent to be sprayed onto the article to be cleaned is dependent on the pressure of the cleaning agent and governs the kinetic energy of the cleaning agent.

The degreasing-cleaning method of the present invention removes organic substances, which are insoluble in water, from the article to be cleaned without using any surfactant, acid or alkali, and is therefore unlikely to cause environmental pollution, effectively forces off deposit from the article, prevents the removed deposit from adhering to the article again and assures effective cleaning.

Further if an ultrasonic cleaning step is practiced in combination with a spray cleaning step for cleaning, the deposit can be effectively removed from the article to be cleaned even if the deposit includes mold releasing agents of different solubilities, such as paraffinic releasing agent and soap-type releasing agent.

DESCRIPTION OF THE PREFERRED EMBODIMENTS

Embodiments of the invention will be described below in detail with reference to the drawings.

Figure 1:
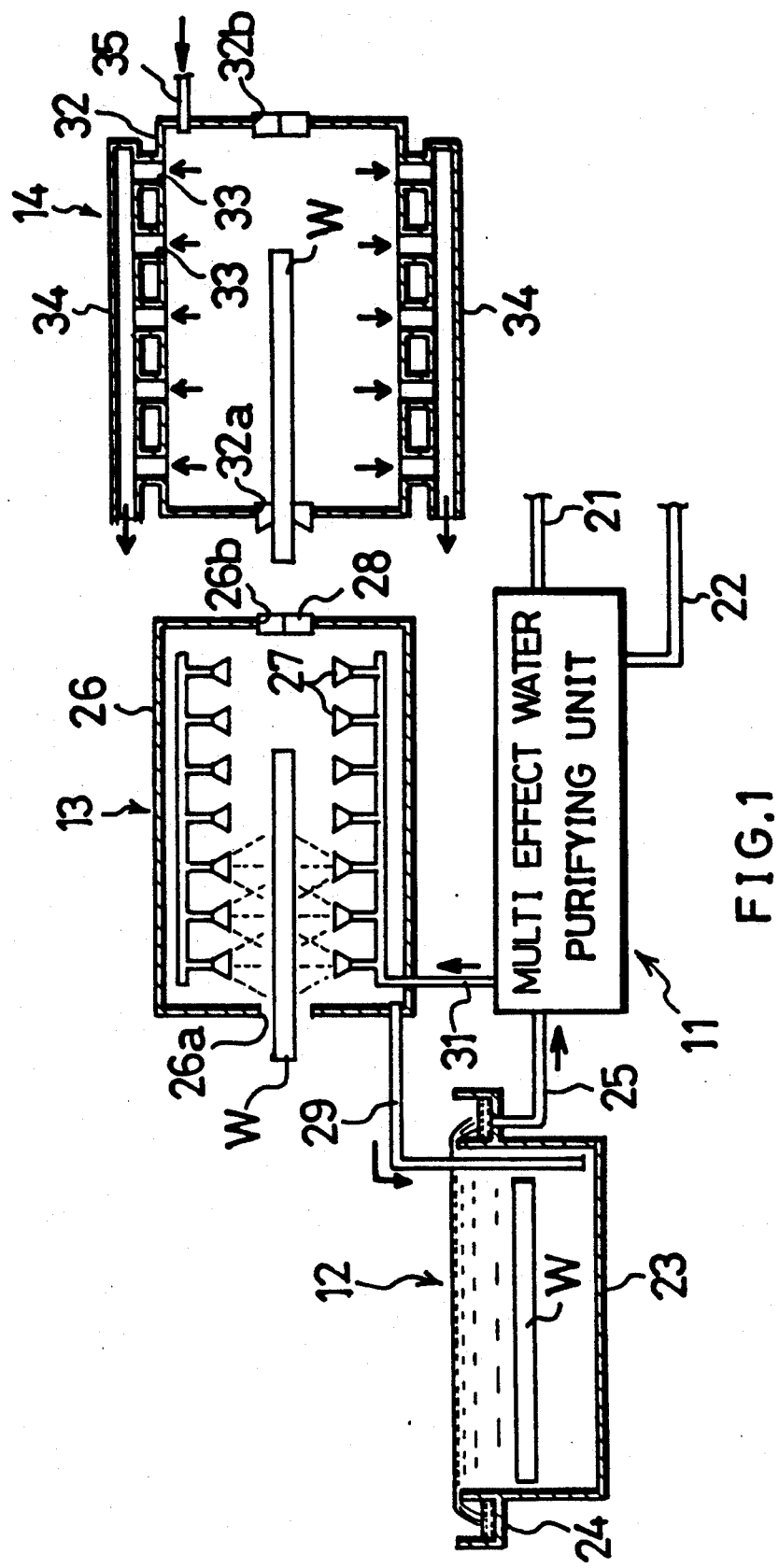
FIG. 1 is a diagram showing the construction of an apparatus for use in practicing the method of the invention.

With reference to FIG. 1, an apparatus for use in practicing the method of the invention comprises a multi-effect water purifying unit 11, ultrasonic cleaning unit 12, spray cleaning unit 13 and dryer 14.

The water purifying unit 11 has connected thereto a pipe 21 for supplying city water (industrial water) and a water discharge pipe 22.

The ultrasonic cleaning unit 12 has an ultrasonic cleaning tank 23 having an unillustrated ultrasonic oscillator. An annular overflow collecting trough 24 is provided around the tank 23 close to its upper end. An overflow collecting pipe 25 has one end connected to the trough 24 and the other end connected to the water purifying unit 11.

The spray cleaning unit 13 comprises a spray chamber 26, and a multiplicity of spray nozzles 27 suitably arranged within the spray chamber 26. The spray chamber 26 has an inlet 26a and an outlet 26b in the respective end walls thereof. The outlet 26b is provided with a water removing device 28. A pipe 29 for collecting the sprayed cleaning agent has one end connected to the bottom of the spray chamber 26 and the other end extending into the ultrasonic cleaning tank 23. A pure water supply pipe 31 has one end connected to the spray nozzle 27 and the other end connected to the water purifying unit 11.

The dryer 14 comprises a suction chamber 32 having an inlet 32a and an outlet 32b in the respective end walls thereof. The suction chamber 32 has a multiplicity of suction ports 33 arranged suitably and communicating with suction pipes 34. A clean air supply pipe 35 is connected to the suction chamber 34.

The dryer 14 may be replaced by a hot or cold air dryer, far infrared radiation dryer, vacuum dryer or the like.

A liquid cleaning agent is supplied from the multi-effect water purifying unit 11 to the spray nozzles 27 via the pure water supply pipe 31. The supplied agent is sprayed from the nozzles 27, collected in the bottom of the spray chamber 26 and sent to the bottom of the ultrasonic cleaning tank 2 through the collecting pipe 29. The liquid cleaning agent sent to the tank 23 flows from the bottom upward through the tank and overflows the tank. The overflow is collected by the trough 24 and returned to the water purifying unit 11 via the overflow collecting pipe 25 for reuse.

The collected pure water is concentrated in the water purifying unit 11 and then drawn off via the discharge pipe 22. When required, the discharged pure water is subjected to waste treatment. When required, on the other hand, the multi-effect water purifying unit 11 is replenished with city water through the supply pipe 21.

The articles to be degeased or cleaned are motor vehicle bumpers W. Each bumper W is transported from the ultrasonic cleaning tank 23 through the spray chamber 26 into the suction chamber 32 and delivered from the chamber 32 by unillustrated suitable means.

First for precleaning by the ultrasonic cleaning unit 12, the bumper is immersed in the liquid within the tank 23 and ultrasonically cleaned. While satisfactory results can be achieved using ultrasonic waves of about 40 KHz, waves of the order of megahertz may be used depending on the type of articles to be cleaned. While a detailed description will be given later, a cleaning effect produced ultrasonically and a cleaning effect achieved by the cleaning agent having a high temperature (of at least 50° C.) efficiently remove especially soap-type mold releasing agents having high solubility. When desired, an oxidizer, such as hydrogen peroxide ($H_2O_2$), which will not burden the water treatment may be added to the cleaning agent to ensure an enhanced cleaning effect.

Subsequently, the bumper is cleaned for finishing by the spray cleaning unit 13. The bumper W is sent into the spray chamber 26 from the inlet 26a. During transport through the chamber 26, the cleaning agent sprayed from the nozzles 27 is uniformly applied to the bumper W to remove a mold releasing agent from the bumper. When the cleaned bumper W is delivered from the spray chamber 26 through the outlet 26b, the liquid cleaning agent is removed from the bumper W by the device 28.

The bumper W discharged from the spray chamber 26 is sent into the suction chamber 32. While the bumper W passes through the chamber 32, the cleaning agent adhering to the bumper is completely dried.

The cleaning effect of the method of the present invention will be described in detail with reference to the following two examples.

EXAMPLE 1

In this example, spray cleaning only was practiced without conducting ultrasonic cleaning, and the cleaning effect achieved will be described in comparison with the result attained by a conventional method.

The conventional method is the one already described as such wherein an organic solvent is used as a liquid cleaning agent.

In the method of the invention, pure water which was 15 megohm-cm in resistivity was used at a temperature of 80° C. and pressure of 10 kg/cm$^2$. The pure water was obtained by passing city water through a reverse osmosis membrane and passing the filtrate through two stages of mixed ion exchange resins. The water was 0.02 ppm in soluble solids content.

The articles to be cleaned were bumpers having a paraffinic mold releasing agent adhering thereto.

The cleaning effect was evaluated in terms of the adhesion of a coating composition to the bumper and the critical surface tension thereof. The cleaned bumper was tested for the adhesion of the coating composition by applying the composition to the bumper, cutting the coating crosswise to form 100 squares each measuring 1 mm×1 mm, adhering a tape to the coating, peeling off the tape and counting the number of squares remaining on the bumper without being peeled off. The critical surface tension before cleaning was 25 dynes/cm$^2$.

Table 1 shows the results of evaluation.

TABLE 1

|  | Adhesion of coating composition | Critical surface tension |
| --- | --- | --- |
| Conventional | 100 | 32–36 dynes/cm$^2$ |
| Invention | 100 | 34–36 dynes/cm$^2$ |

As will be apparent from Table 1, the method of the invention and the conventional method achieved exactly the same result in respect of the adhesion of coating composition, and approximately the same result in critical surface tension. Thus, the same satisfactory result as is attained by the conventional method can be achieved without using any organic solvent.

Figure 2:
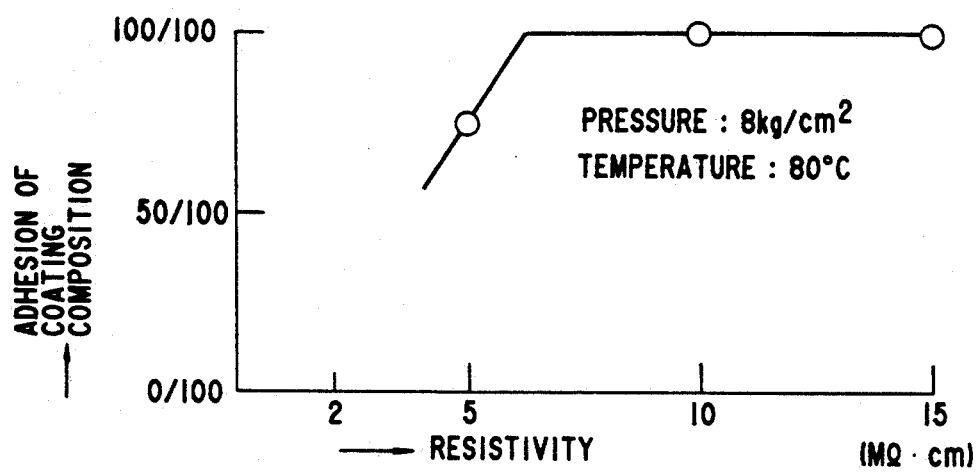
FIG. 2 is a graph showing the relationship between the resistivity of a cleaning agent and the adhesion of a coating composition.
Figure 3:
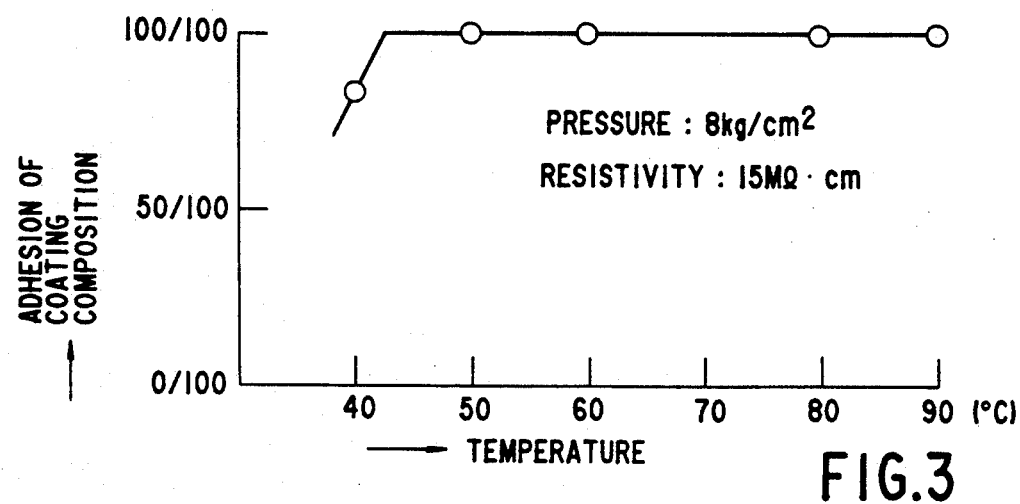
FIG. 3 is a graph showing the relationship between the temperature of the cleaning agent and the adhesion of the coating composition.
Figure 4:
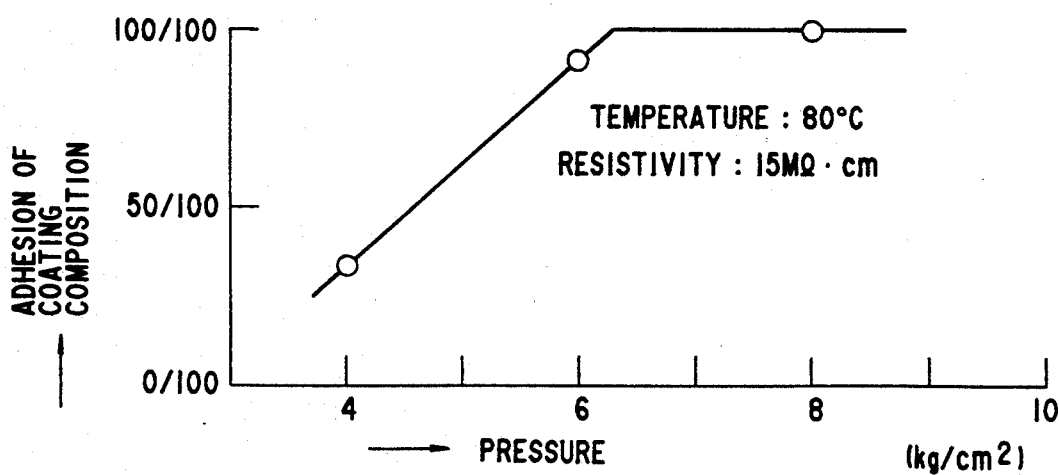
FIG. 4 is a graph showing the relationship between the pressure of the cleaning agent and the adhesion of the coating composition.

FIGS. 2 to 4 are graphs showing the relations of the adhesion of coating composition to the resistivity, temperature and pressure of the liquid cleaning agent, as established by determining the adhesion in the same manner as above after cleaning bumpers using cleaning agents of varying resistivities, temperatures or pressures. FIGS. 2, 3 and 4 show that the lower limits of resistivity, temperature and pressure are 10 megohm-cm, 50° C. and 8 kg/cm$^2$, respectively, with allowance considered, when satisfactory results are to be achieved.

EXAMPLE 2

For cleaning, spray cleaning only was practiced as test 1, and ultrasonic cleaning and spray cleaning were practiced in combination as test 2. The liquid cleaning agent used was the same pure water as used in Example 1.

Bumpers having one of two mold releasing agents adhered thereto were tested. Those to which a paraffinic mold releasing agent adhered were used as samples 1, and those bearing a soap-type mold releasing agent were handled as samples 2.

The cleaning effect was evaluated in terms of the adhesion of a coating composition in the same manner as in Example 1. Thus, 100 squares were formed on the coated surface, a tape was adhered to the coating and then peeled off, and the number of squares remaining on the substrate was counted. If no square was peeled off, the result was evaluated as "good". If even one square was peeld off, the result was evaluated as "poor."

TABLE 2

|  | Sample 1 | Sample 2 |
| --- | --- | --- |
| Test 1 | Good | Poor |
| Test 2 | Good | Good |

Table 2 reveals that the releasing agent is removable by spray cleaning only if it is paraffinic, and that it is desirable to practice spray cleaning and ultrasonic cleaning in combination when the releasing agent is of the soap type.

Figure 5:
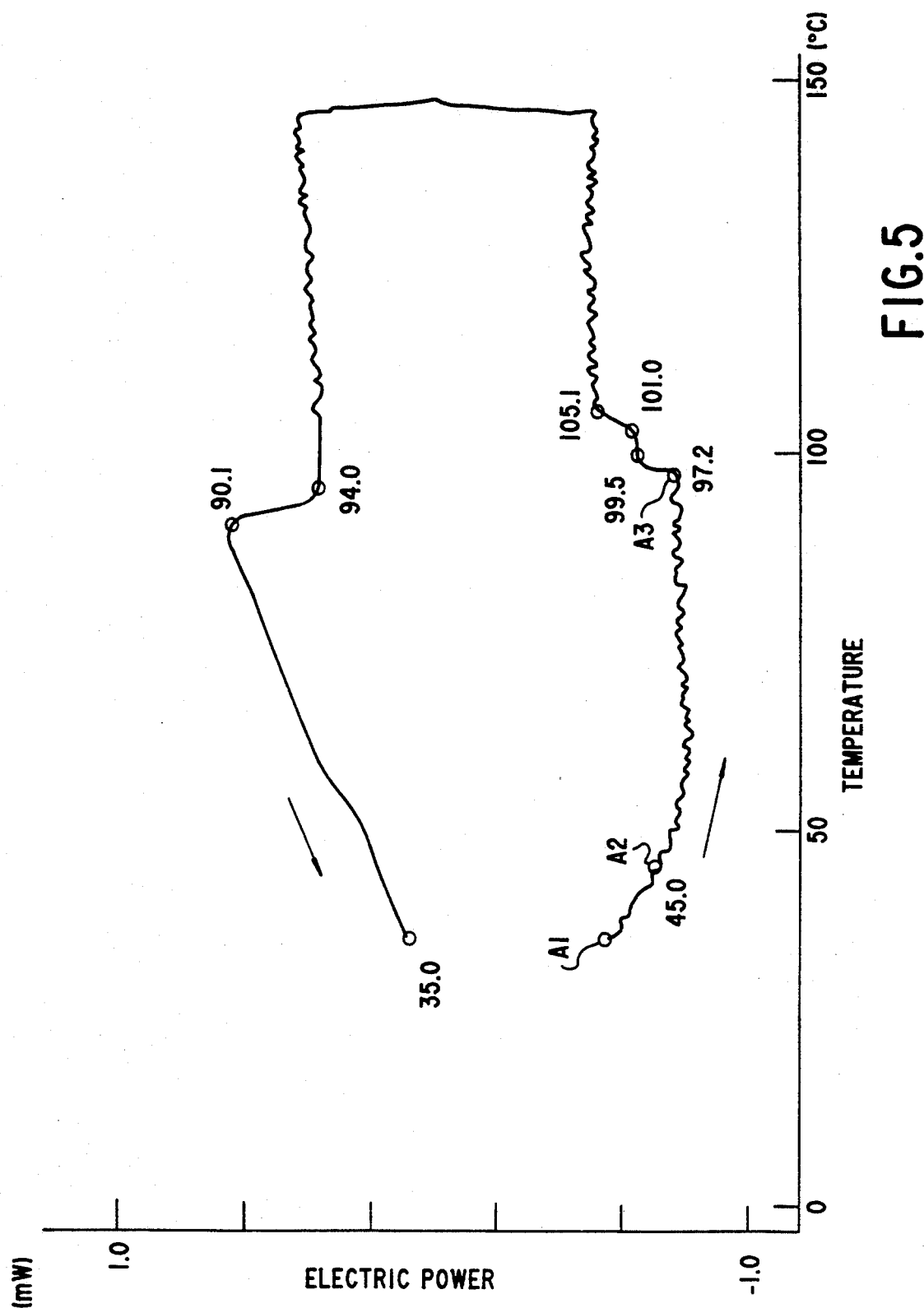
FIG. 5 is a graph showing the measurements obtained for a paraffinic mold releasing agent by differential scanning calorimetry.
Figure 6:
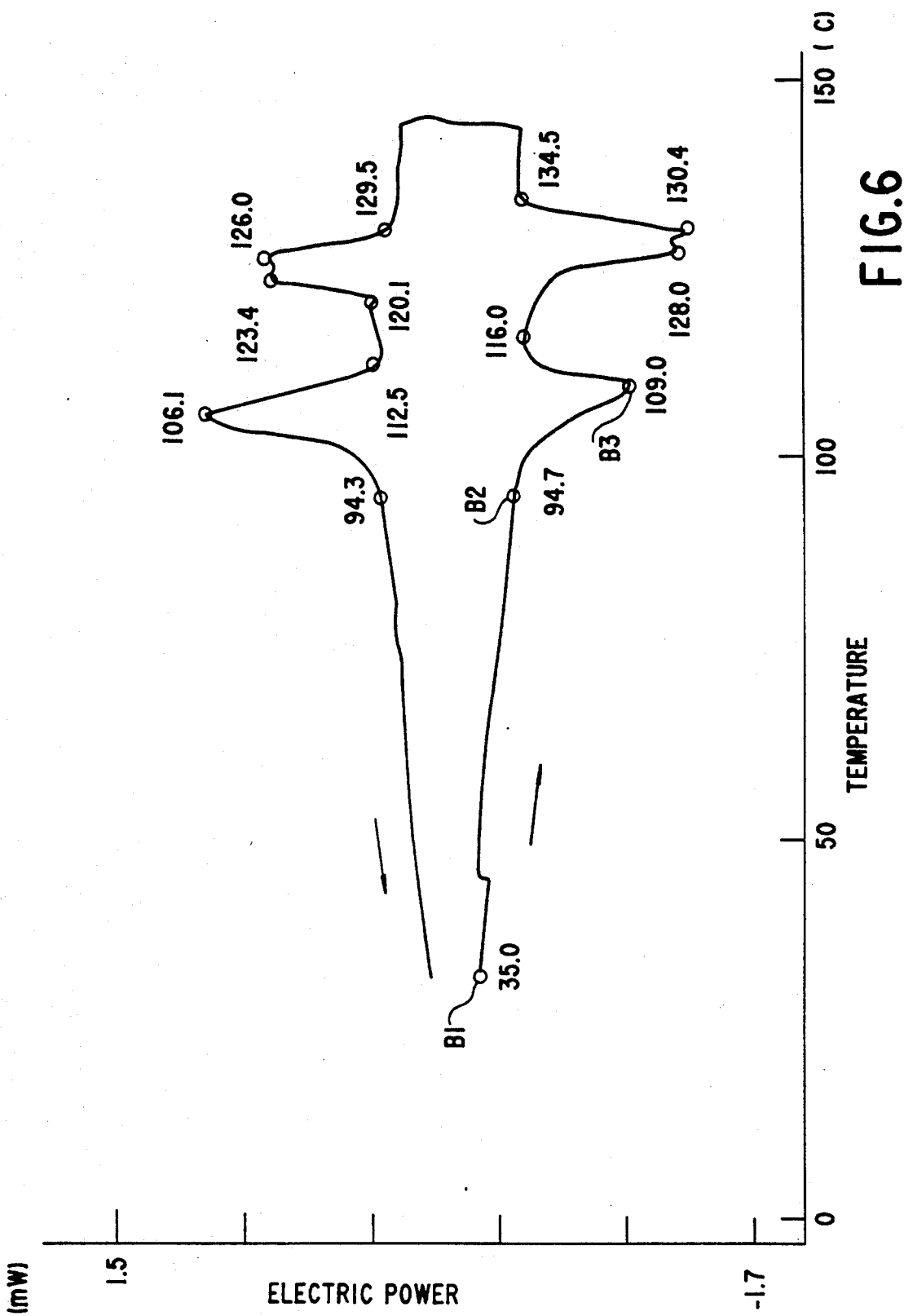
FIG. 6 is a graph showing the measurements similarly obtained for a soap-type mold releasing agent; and FIG. 7A
Figure 7A:
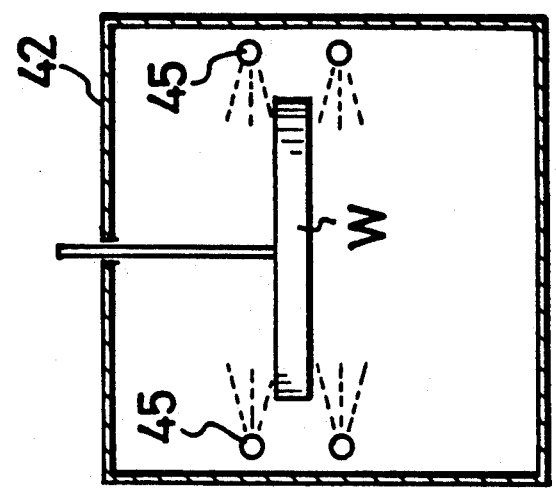
FIG. 7B is a diagrams showing the construction of an apparatus for use in a conventional method.
Figure 7B:
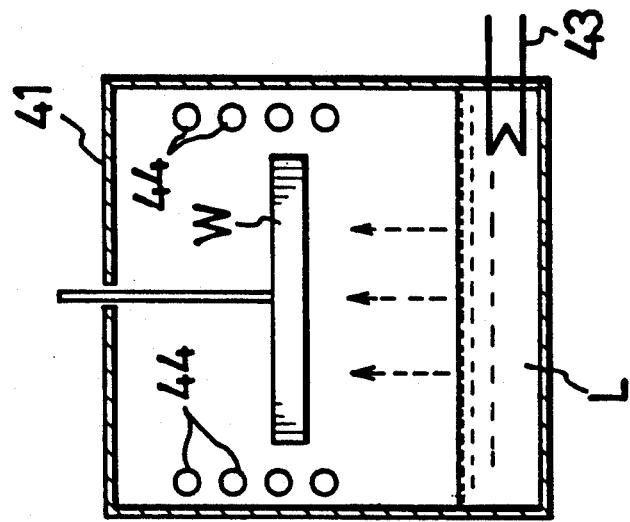

The reason is that the paraffinic releasing agent and the soap-type releasing agent differ in the solubility as seen in FIGS. 5 and 6.

The measurements obtained by DSC (differential scanning calorimetry) are shown in FIG. 5 for the paraffinic mold releasing agent or in FIG. 6 for the soap-type mold releasing agent. The heating program is as follows. The sample was heated from 35° C. to 150° C. by raising the temperature at a rate of 2° C./min, maintained at 150° C. for 10 minutes and thereafter lowered in temperature to 35° C. at a rate of 2° C./min.

With reference to FIG. 5, at time A2 when the temperature rises by 10° C. after the start of heating at time A1, the sample separates into two layers of solid and liquid. At time A3 when the temperature of the sample rises to 100° C., the sample is decomposed in the form of liquid.

With reference to FIG. 6, the sample remains solid from time B1 of start of heating until time B2 when the temperature of the sample rises nearly to 100° C. The sample thereafter separates into the two layers of solid and liquid and changes to a liquid at time B3 when the temperature is nearly 100° C.

The foregoing reveals that the liquid cleaning agent, when having a temperature of at least about 50° C., effectively removes the paraffinic mold r=leasing agent. However, it appears that the cleaning agent at about 50° C. fails to effectively remove the soap-type mold releasing agent.

What is claimed is:

1. A degreasing-cleaning method for removing a water-insoluble organic releasing agent from a molded plastic article, comprising spraying said plastic article with pure water of at least 10 megohm-cm in resistivity at a pressure of at least 8 kg/cm$^2$, thereby removing said water-insoluble organic releasing agent from the plastic article.

2. A method as defined in claim 1 wherein the pure water is at least 50° C. in temperature.

3. A method as defined in claim 1 which employs a water purifying unit for obtaining the pure water and nozzles for spraying the pure water onto the plastic article, and wherein the pure water is supplied from the water purifying unit to the nozzles, and the pure water sprayed from the nozzles is collected in the water purifying unit.

4. A method as defined in claim 2 wherein the plastic article to be cleaned is precleaned by being placed into an ultrasonic cleaning tank containing the pure water and then delivered from the tank, and the pure water is thereafter sprayed onto the plastic article to be cleaned at a pressure of at least 8 kg/cm$^2$ and thereby cleaned for finishing.

5. A method as defined in claim 4 which employs a water purifying unit for obtaining the pure water and nozzles for spraying the pure water onto the plastic article to be cleaned, and wherein the pure water is supplied from the water purifying unit to the nozzles, and the pure water sprayed from the nozzles is collected in the water purifying unit by way of the ultrasonic cleaning tank.

6. A method as defined in claim 1, wherein said releasing agent is paraffinic.

* * * * *